United States Patent [19]

Andersen

[11] Patent Number: 4,575,262

[45] Date of Patent: Mar. 11, 1986

[54] TEMPERATURE INDICATOR FOR A FLUID FIXTURE

[75] Inventor: Markham L. Andersen, Toronto, Canada

[73] Assignee: Anderstat Controls, Scarborough, Canada

[21] Appl. No.: 554,488

[22] Filed: Nov. 22, 1983

[51] Int. Cl.⁴ .................. G01K 1/14; G01K 13/02
[52] U.S. Cl. .................... 374/147; 374/170; 137/551
[58] Field of Search ............ 374/141, 147, 148, 138, 374/170; 99/343; 137/551, 552.7, 553, 554

[56] References Cited

U.S. PATENT DOCUMENTS

| | | | |
|---|---|---|---|
| 899,201 | 9/1908 | Braybook | 374/147 |
| 1,978,992 | 10/1934 | Donnelly | 374/147 |
| 3,721,386 | 3/1973 | Brick et al. | 137/625.41 |
| 4,133,208 | 1/1979 | Parlanti | 374/170 |
| 4,406,398 | 9/1983 | Perkins | 137/551 |
| 4,444,517 | 4/1984 | Murase | 374/208 |

Primary Examiner—Charles Frankfort
Assistant Examiner—Thomas B. Will
Attorney, Agent, or Firm—Rogers, Bereskin & Parr

[57] ABSTRACT

A temperature indicator for a fluid fixture, such as a faucet, is adapted to be mounted on the fixture. It can be mounted within the handle of a faucet and can be stationary while the handle rotates. It includes a temperature probe which is subject to temperature of fluid flowing through the fixture. A power supply, for example solar cells, and electric circuit means are provided. A display device is connected to, and driven by, the electric circuit, and is arranged on an external surface of fluid fixture. The display device indicates the temperature sensed by the temperature probe.

14 Claims, 3 Drawing Figures

TEMPERATURE INDICATOR FOR A FLUID FIXTURE

This invention relates to a temperature indicator for a faucet.

It has long been recognized that it is desirable to provide some indication of the temperature of water supplied from a mixer tap or a shower. If no temperature indication is provided, regulation and adjustment of the temperature can be difficult.

U.S. Pat. No. 2,112,648 discloses a thermometer adapted to be mounted to a faucet, so that it is subject to the temperature of water or other fluid discharging from the faucet. The arrangement is relatively crude. It suffers from the disadvantage that the tap or faucet is partially obstructed by the thermometer sticking out to one side. Further, to ascertain the temperature, the thermometer has to be read, which is not particularly easy. There is also the danger that, in use, the thermometer could be damaged by articles knocked against it.

U.S. Pat. Nos. 2,626,254 and 3,960,016 both disclose temperature indicators for a plumbing fixture. U.S. Pat. No. 2,626,254 discloses a temperature indicator for a shower head, whilst U.S. Pat. No. 3,960,016 discloses a temperature indicator for a water mixing valve. In both these patents, the temperature indicator utilizes a bimetallic temperature sensing element. The bimetallic element is connected to a rotatably mounted needle of a dial type indicator. Such a construction is relatively complex, and may well not provide a very precise indication of the temperature. Further, the needle mechanism is quite sensitive and must be protected from the corrosive and other effects of water flowing through the fixture. In both designs, the dial is provided above the actual fixture itself, but, in U.S. Pat. No. 2,626,524 the dial is provided above the perforated head of the shower directed towards a user of the shower. Similarly, in U.S. Pat. No. 3,960,016 the dial is provided above the actuating handle of the valve. This results in plumbing fixtures which are larger and more ungainly than ordinary fixtures.

U.S. Pat. No. 3,952,594 discloses another mechanical-type temperature indicator. Again, a bimetallic element is used. The bimetallic element is provided as a helical coil in a short tube element. The tube element has an external thread for screwing into the spout of a faucet. One end of the coil is attached to an indicator, whose position is indicative of the temperature.

All these devices are essentially mechanical and suffer from a number of disadvantages. Firstly, all parts in contact with water ought to be made of a non-corrosive material. It must be ensured that moving parts are free from fouling or obstruction over a long period of time. These requirements are difficult to meet. They are relatively bulky. They also have a slow response time. This is inconvenient for the user, and can be wasteful of hot water, as after setting the faucet the user must wait for the temperature indicator to adjust to the new temperature.

U.S. Pat. No. 4,281,543 discloses a hand shower and temperature indicating unit. The unit is provided with a heat transferring wall one side of which defines part of a conduit for water. On the other side of the wall, a liquid crystal temperature indicating means is positioned. The disclosure in this patent is somewhat unclear as to the way in which the liquid crystal temperature indicating means operates but it seems that the liquid crystals respond to the temperature of the water, to give an indication of the water temperature. It is suggested that a wide range of possible temperature readings could be given, for example, 12 different readings. Further, it is suggested that the liquid crystals could be arranged to give word or letter readings, as well as a specific read-out in degrees. However, it seems clear that this is a relatively simple device, which is only able to give an approximate figure for the temperature of the water. It relies solely on the temperature dependant characteristics of liquid crystals.

According to the present invention, there is provided a temperature indicator for a fluid fixture, the temperature indicator being adapted to be mounted on the fluid fixture, and the temperature indicator comprising:

a temperature probe adapted to be secured to a part of the fluid fixture, so as to be subject to temperature of fluid flowing through the fixture;

electric circuit means connected to the temperature probe;

power supply means for supplying electrical power to the temperature indicator and connected to the circuit means to supply power to the circuit means; and a display device connected to and driven by the circuit means and arranged on an external surface of the temperature indicator, to provide an indication of the temperature of the fluid sensed by the temperature probe.

In a preferred embodiment of the present invention, the temperature indicator is adapted to be mounted in the handle or knob of a faucet or tap for water. Preferably, the indicator is mounted so that it remains stationary, whilst the knob or handle rotates about it. This is particularly advantageous, when a digital display is provided.

The indicator can be arranged to remain stationary, as the handle rotates around it, in a number of ways. The power supply, in the form of solar cell means, and the display device can be secured to the electric circuit means. The electric circuit means can then be connected by an elongate shaft to the temperature probe, the shaft and the temperature probe being arranged in a bore of the handle and coaxial with the handle, to permit the handle to rotate freely. Many faucets have handles that only have a restricted range of movement. In this case, a connection can be provided between the temperature probe and the electric circuit in an arcuate slot on one side of the handle, the arcuate slot being dimensioned to permit the required movement of the handle. This arrangement has the advantage that the indicator can be more readily adapted to different fixtures; no substantial redesigning of the fluid fixture is required.

The display device can be any low powered device, which preferably can be driven by the solar cells although other power sources, such as batteries, can be used. A liquid crystal display device is preferred. The display device can either give a digital read-out in any desired temperature scale, for example degrees fahrenheit or degrees celsius. Alternatively, it can provide a visual indication of the temperature. For example, a series of liquid crystals could be provided, adjacent a strip, whose colour changes from blue at one end to red at the other end, to indicate cold and hot temperatures respectively. Alternatively, it may be possible to provide liquid crystals of varying colours, which serve a similar function.

It is envisaged that the temperature indicator of the present invention will be particularly suited to mixer faucets or taps, which serve the dual purpose of controlling water flow and controlling water temperature. For this purpose, such a faucet has an inlet for hot water and an inlet for cold water, and the handle is rotated to adjust the water temperature and moved in an axial direction to control water flow. Again, the temperature indicator is advantageously mounted in the handle, so that it remains still, whilst the handle rotates about it. The user can then readily adjust the temperature of the water to any desired value.

For a better understanding of the present invention, and to show more clearly how it may be carried into effect, reference will now be made, by way of example, to the accompanying drawings, which show an embodiment of the invention and in which.

Figure 2:
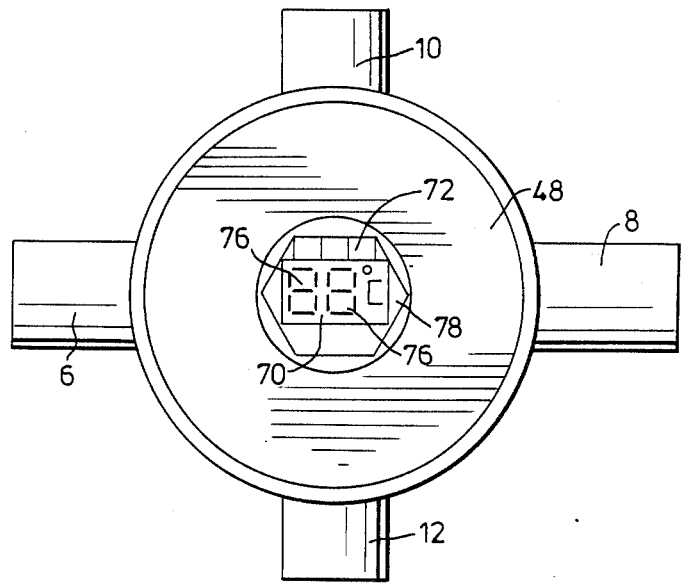
FIG. 2 shows a plan view of the mixer faucet of FIG. 1.

The mixer valve shown in the drawings is generally denoted by the reference 1. The water controlling components of the mixer valve are of known construction. In order to aid understanding of the construction of the temperature indicator of the present invention, the construction of the valve components is described briefly below. The mixer valve 1 has a main body 4, which is cast from brass or other metal. The body 4 defines an inlet duct 6 for cold water and an inlet duct 8 for hot water. Free ends of these ducts 6, 8 are adapted to receive or to be connected to supply pipes. For example, their ends could be provided with an external screw thread. For clarity, such screw threads and the like are not shown. With reference to FIG. 2, the body 4 additionally defines outlet ducts 10 and 12. These outlet ducts can be provided with an internal screw thread, for connection to outlet pipes, but again such screw threads are not shown here. Secured to the body 4 is a housing 14, which houses the actual flow control components. The housing 14 is secured by screws 16 to a top surface 18 of the body 4. On an inner portion of this surface 18, there is mounted a first valve member 20 and a second valve member 22. Each of the valve members, 20,22 has two opposite generally parallel faces. Disposed between the housing 14 and the body 4 is a gasket 24. The lower surface of the first valve number 20 abuts this gasket 24. Additionally, rubber, resilient sealing rings 26 are located in apertures in the gasket 24 and in recesses in the first valve 20. These rings 26 ensure that a watertight seal is provided between the first valve member 20 and the main body 4. The top surface of the valve member 20 and the bottom surface of the valve member 22 abut one another, and are highly polished, so as to provide a water tight seal. Both the valve numbers 20 and 22 are made of a hard, ceramic or ceramic type material.

The first valve number 20 is provided with first and second inlet openings 28, 29 (shown in FIG. 1), and first and second outlet openings 30, 31 (not shown). The outlet openings 30, 31 are connected by a channel or groove 34 extending across the top of the first valve number 20. The outlet openings 30, 31 open into the outlet ducts 10, 12.

The second valve member 22 is provided with a recess 36, which is of a rounded W-shape. This recess permits the desired mixing function to be provided. Its shape, and the mode of operation are not described in greater detail here.

Although not shown, the first valve member 20 is located in position and prevented from rotation by lugs of the housing 14 engaging slots in the valve number 20. For rotation of the second valve number 22, a connecting bar 38 is provided. This bar 38 has projections 40 at either end, which engage corresponding recesses 42 in the second valve number 22. The connecting bar 38 has a central bore, in which is secured one end of a hollow cylindrical shaft 44. This shaft 44 is rotatably mounted in a sleeve 46 of the housing 14, and to the other end of the shaft 44 a handle or knob 48 is secured.

In accordance with the present invention, within the cylindrical shaft 44 and knob 48, there is a temperature indicator generally indicated by the reference 60. At its lower end, the temperature indicator 60 has a temperature probe 62, which is generally disc shaped and located in a corresponding recess 64 in the channel 34 of the first valve member 20. The temperature probe 62 is connected by a shaft 66 to an electrical circuit indicated generally at 68. The shaft 66 serves to provide both mechanical and electrical interconnection between the temperature probe 62 and the circuit 68. On top of the circuit 68, as shown best in FIG. 3, there is provided a liquid crystal display 70 and solar cells 72. The solar cells 72 are connected to the electric circuit 68, to provide power for the electric circuit 68. The liquid crystal display 70 is connected to both the electric circuit 68 and the solar cells 72. It is controlled by the electric circuit 68, and powered by the solar cells 72.

The temperature probe 62 extends through the second valve member 22, which has a seal for it to permit rotation of the valve member 22. The temperature probe 62 is inserted into its recess 64, so that it cannot rotate, thus preventing any rotation of the whole temperature probe 60. This can be achieved by giving the temperature probe 62 and its recess 64 corresponding non-circular shapes, or by making them generally circular and providing an indentation and a corresponding projection. The elements 68, 70, 72 forming the top of the temperature indicator 60 are arranged in a generally circular recess 74 of the handle or knob 48, with adequate spacing. Consequently, the knob or handle 48 is free to rotate, whilst the temperature indicator 60 is held stationary, with the display 70 in the desired orientation.

FIG. 2 shows one possible arrangement for the display 70. Here a digital LCD display is provided, with each digit being formed by known element having seven individual bars. Each of these elements is indicated at 76. As indicated at 78, a permanent indication can be given of the temperature scale in which the temperature is given, for example, degrees celsius or degrees fahrenheit.

The liquid crystal display 70 and the solar cells 72 can be arranged in any convenient pattern. As shown, the solar cells 72 are provided above the liquid crystal display 70. The solar cells 72 could alternatively be arranged at the top and bottom of the display 70, or on all sides of it.

To protect the temperature indicator 60, and in particular the display 70 and solar cell 72, a snap-on cover 80 is provided. This cover 80 snaps into the recess 74 of the handle 48, and rotates with it about the temperature indicator 60. This ensures that no moisture can get to the temperature indicator 60.

Figure 1:
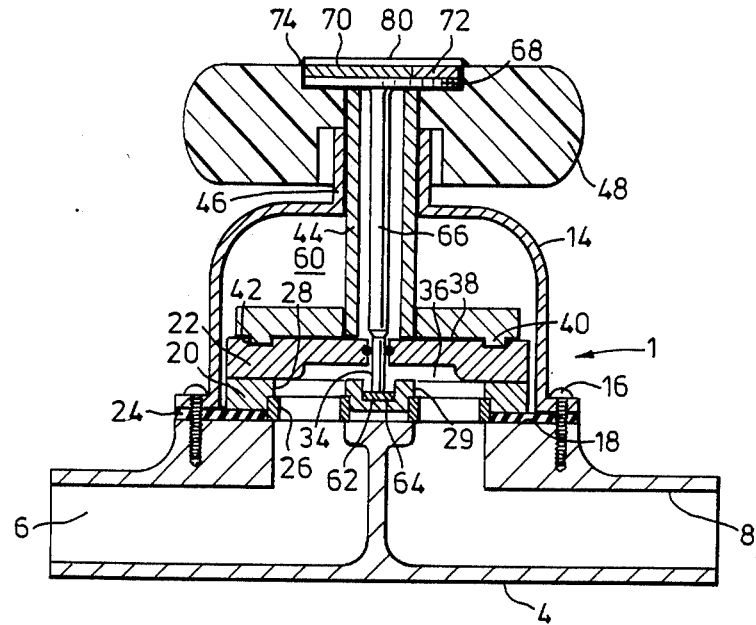
FIG. 1 shows a cross-section through a mixer faucet including a temperature indicator according to the present invention.
Figure 3:
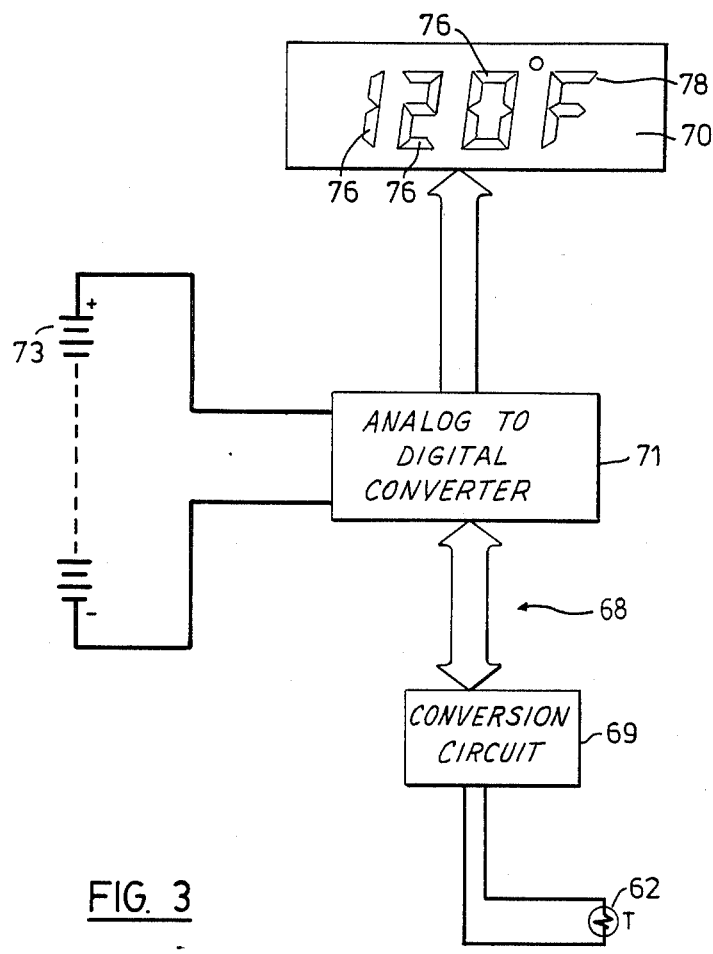
FIG. 3 shows schematically a block diagram of the circuitry of the temperature indicator.

In FIG. 3, a block diagram of the circuitry is shown. The temperature probe 62 could be any type of probe that produces an electrical output dependent on the temperature. It could be, for example, a device including an element with a high temperature coefficient of resistance. Here, the electric circuit means 68 comprises a temperature to voltage conversion circuit 69 and an integrated circuit analog to digital converter 71. The power supply is shown in FIGS. 1 and 2 as comprising solar cells 72, but other power sources are possible. In FIG. 3, for example, a battery is indicated at 73. This battery 73 is connected to the analog to digital converter 71, and via this converter 71 supplies power to the display 70 and conversion circuitry 69.

The conversion circuitry converts an output signal from the probe 62 into an analogue voltage. This analogue voltage is then converted to a digital signal in the converter 71, which drives the display 70, to give an indication of the temperture sensed by the probe 62.

Optionally, the temperature indicator can be provided with means for actuating the temperature indicator when there is fluid flow through the mixer valve, or other fluid fixture, and for switching the temperature indicator off in the absence of fluid flow. This is preferably achieved by providing a flow sensor either in one or both of the outlet ducts 10, 12, or in the mixing chamber or recess 36 of the second valve member 22. Such a sensor is indicated schematically at 90 for the recess 36. The sensor 90 is connected to the electric circuit means 68, and switches it on, when there is fluid flow. In the absence of fluid flow, it switches the circuit means 68 and hence the whole indicator 60 off. This will save on electrical power, and is of little or no disadvantage to the user, as one is only interested in the temperature when the fluid fixture is used.

Whilst FIGS. 1, 2 and 3 show two alternative power sources 72, 73, it is possible for both these power sources to be provided. This is expected to be particuarly useful for locations such as shower enclosures, where the lighting is very low when the shower curtain is drawn. Then, solar cells would not provide enough power. So, batteries are provided, which will automatically supply the required power, when the output of the solar cells falls below a preset level. The batteries are rechargeable, so in the presence of adequate lighting, e.g. after opening the shower curtain, the solar cells will automatically recharge them.

The provision of both power supplies and switching to deactivate the temperature indicator in the absence of fluid flow will also enable solar cells of lower output to be used. The solar cells need only provide an output adequate to cover the mean power demand of the indicator. When it is switched on, the batteries will supply the required power, either solely or in conjunction with the solar cells. When the indicator is switched off, the solar cells will recharge the batteries.

Although the temperature indicator 60 has been described in relation to a mixer tap it is envisaged that it could be applied to a tap or faucet, which provides for mixing hot and cold water and for controlling the water flow rate. In this case, the movable valve element is a cartridge or cylinder, which can be rotated within a housing and displaced axially. The temperature probe 62 or shaft 66 would then engage an elongate sleeve, which would permit axial movement of the temperature probe 60, but prevent it from rotating. This would enable the temperature indicator 60 to be moved in and out axially with the respective handle, but prevent it from rotating as the handle is rotated. Otherwise, the temperature indicator would function as in the embodiment shown in the drawings.

Whilst the embodiment shown in FIGS. 1 and 2 has the temperature indicator arranged stationary, it is also possible for the temperature indicator to be mounted so that it rotates with the handle 48. This is particularly suited to handles having only a small arc of rotation, as the display 70 is then never at a great angle from its central position. Additionally, instead of a shaft 66, other means can be provided for connecting the circuitry 68 to the probe 62. For example, the probe 62 can be mounted on an external portion of an outlet duct and connected by wires to the circuitry 68 in the handle 48. The handle 48 is of the type having movement through a limited area only. The handle 48 can be provided with arcuate slots for the wires and for mounting members that support the main part of the indicator 60 on the casing 14. These slots permit the handle 48 to rotate freely. Then, it may be possible to simply replace the knob or handle 48 of an existing faucet to accommodate the temperature indicator 60 of the present invention.

If the indicator 60 is arranged to rotate with the handle 48, then in the embodiment shown, the temperature indicator 60 can be simplified. The probe 62 can be located in a recess on top of the second valve member 22, and will rotate with it. The rotating seal in the second valve member 22 can then be eliminated.

The indication of the temperature scale, marked at 78 can either be a permanent indication, or as indicated in FIG. 3 it can form part of the LCD display 70. Also, preferably, the element indicating temperature and the circuitry 68 are formed to enable the temperature indicated to be either in degrees Celsius or degrees Fahrenheit. This can be achieved by providing a switching element which is switched by the supplier or installer so that the temperature scale desired by the user is shown.

I claim:

1. A temperature indicator for a fluid fixture, the temperature indicator being adapted to be mounted in a rotatable handle of the fluid fixture, and the temperature indicator comprising:
    a temperature probe adapted to be secured to a part of the fluid fixture, so as to be subject to temperature of fluid flowing through the fixture;
    electric circuit means connected to the temperature probe;
    power supply means for supplying electrical power to the temperature indicator and connected to the circuit means to supply power to the circuit means; and
    a display device connected to and driven by the circuit means, to provide an indication of the temperature of the fluid sensed by the temperature probe;
    wherein the display device and the power supply means are formed as a single unit, adapted to be mounted in a handle of such a fluid fixture, with the display device located on an external surface of the handle, and wherein the temperature indicator includes a part adapted to be secured to the fluid fixture, so that, as the handle is rotated, the temperature indicator remains stationary.

2. A temperature indicator as claimed in claim 1, wherein the power supply means comprises a terminal for connection to an electric battery.

3. A temperature indicator as claimed in claim 1, wherein the power supply means comprises a terminal for connection to an electric battery, and wherein the unit comprising the power supply means and the display device includes a compartment for such an electric battery.

4. A temperature indicator as claimed in claim 1, wherein the power supply means comprises solar cell means.

5. A temperature indicator as claimed in claim 1, wherein the power supply means comprises solar cell means, and wherein the solar cell means and the display device are secured to the electric circuit means.

6. A temperature indicator as claimed in claim 5, wherein an elongate shaft extends between the electric circuit means and the temperature probe.

7. A temperature indicator as claimed in claim 1, 5 or 6, wherein the electric circuit means comprises a temperature to voltage conversion circuit connected to the temperature probe, and an integrated circuit analog to digital converter, which is connected to said conversion circuit and to the power supply means and the display device, the temperature to voltage conversion circuit producing a voltage representative of the temperature sensed by the temperature probe and the integrated circuit analog to digital converter converting that voltage to a digital signal which drives the display device.

8. A temperature indicator as claimed in claim 1, wherein the power supply means comprises solar cell means and an electric battery.

9. A temperature indicator as claimed in claim 8, wherein the battery is rechargeable and can be recharged by the solar cell means.

10. A temperature indicator as claimed in claim 8 or 9, wherein the electric circuit means includes circuitry for automatically switching to the electric battery for at least part of a required power supply, when the power supplied by the solar cell means falls below a preset level.

11. A temperature indicator as claimed in claim 1, which includes a flow sensor connected to the electric circuit means, and which activates the temperature indicator when fluid flow is sensed, but deactivates the indicator in the absence of fluid flow.

12. A fluid fixture, comprising:
a body, a first fixed valve member, a second valve member rotatably mounted in the body, a control means, which has a recess in an outer surface thereof and a bore opening into the recess and which is rotatably mounted and is connected to the second valve member; and, in combination with the fluid fixture, a temperature indicator comprising: a temperature probe secured in the first valve member to prevent rotation of the temperature probe, an elongate shaft secured to the temperature probe and extending through the second valve member and through said bore to the recess of the handle means, with a seal being provided between the second valve member and the elongate shaft, and circuit means, display means and solar cell means, which are interconnected and are connected to the temperature probe, and which are mounted on an end of the elongate shaft so as to be located within the recess, the control means together with the second valve member being freely rotatable relative to the temperature indicator.

13. A temperature indicator, which is adapted for use in a fluid fixture, which includes a first fixed valve member, a second rotatably mounted valve member, a hollow cylindrical shaft connected to the second rotatably mounted valve member and a handle connected to the hollow cylindrical shaft for rotating the second valve member, the temperature indicator comprising:
a temperature probe adapted to be received and secured in a recess of the first valve member, so as to prevent rotation of the temperature indicator;
an elongate shaft connected to the temperature probe and extending therefrom through the hollow cylindrical shaft and through an opening in the second valve member, with a seal being provided between the second valve member and the elongate shaft;
an electric circuit means mounted to the elongate shaft and connected to the temperature probe;
a power supply means comprising solar cell means, which is connected to the electric circuit means; and
a display device connected to and driven by the electric circuit means;
wherein the solar cell means and the display device are adapted to be received in a recess of the handle, so that the solar cell means is illuminated and so that the display device can provide an indication of the temperature of the fluid sensed by the temperature probe.

14. A temperature indicator as claimed in claim 13, wherein the electric circuit means comprises a temperature to voltage conversion circuit connected to the temperture probe, and an integrated circuit analog to digital converter, which is connected to said conversion circuit and to the power supply means and the display device, the temperature to voltage conversion circuit producing a voltage representative of the temperature sensed by the temperature probe and the integrated circuit analog to digital converter converting that voltage to a digital signal which drives the display device.

* * * * *